(12) United States Patent
Alakuijala

(10) Patent No.: US 8,830,182 B1
(45) Date of Patent: Sep. 9, 2014

(54) KEYSTROKE RESOLUTION

(75) Inventor: Jyrki A. Alakuijala, Zurich (CH)

(73) Assignee: Google Inc., Mountain View, CA (US)

( * ) Notice: Subject to any disclaimer, the term of this patent is extended or adjusted under 35 U.S.C. 154(b) by 1157 days.

(21) Appl. No.: 12/702,983

(22) Filed: Feb. 9, 2010

(51) Int. Cl.
*G06F 3/041* (2006.01)

(52) U.S. Cl.
USPC ......................................................... 345/173

(58) Field of Classification Search
USPC .......................................... 345/173–178, 156
See application file for complete search history.

(56) References Cited

U.S. PATENT DOCUMENTS

| | | | |
|---|---|---|---|
| 4,937,778 | A | 6/1990 | Wolf et al. |
| 5,557,686 | A | 9/1996 | Brown et al. |
| 6,047,300 | A | 4/2000 | Walfish et al. |
| 6,323,846 | B1 | 11/2001 | Westerman et al. |
| 6,677,932 | B1 * | 1/2004 | Westerman .................... 345/173 |
| 7,088,845 | B2 | 8/2006 | Gu et al. |
| 7,098,896 | B2 | 8/2006 | Kushler et al. |
| 7,206,938 | B2 | 4/2007 | Bender et al. |
| 7,277,088 | B2 | 10/2007 | Robinson et al. |
| 7,496,842 | B2 | 2/2009 | Chang |
| 2002/0196163 | A1 | 12/2002 | Bradford et al. |
| 2004/0140956 | A1 * | 7/2004 | Kushler et al. ................ 345/168 |
| 2006/0200338 | A1 * | 9/2006 | Cipollone et al. ................ 704/4 |
| 2007/0240045 | A1 | 10/2007 | Fux et al. |

OTHER PUBLICATIONS

Lesher, G.W. et al., "Optimal Character Arrangements for Ambiguous Keyboards", IEEE Trans Rehabil Eng, [online] (Dec. 1998) [retrieved on Jul. 18, 2011]. Retrieved from: <URL:http://www.ncbi.nlm.nih.gov/pubmed/9865889>, 2 pages.
Goodman, Joshua, et al., "Language Modeling for Soft Keyboards", American Association for Artificial Intelligence, [online] (2002) [retrieved on Jul. 18, 2011]. Retrieved from: <URL:http://74.125.113.132/search?q=cache:P-Syd3LXnMkJ:research.microsoft.com/en-us/um/people/joshuago/aaai-final.ps,> 8 pages.
"As U Type", [online] (Feb. 2009) [retrieved on Jul. 18, 2011]. Retrieved from: <URLhttp://web.archive.org/web/20090209045319/http://asutype.com/?>, 2 pages.
"Keystroke Dynamics", Wikipedia, [online] (Feb. 2008) [retrieved on Jul. 18, 2011]. Retrieved from: <URL:http://web.archive.org/web/20080220141730/http:/en.wikipedia.org/wiki/Keystroke_dynamics>, 2 pages.
"Using AutoCorrect", Wiki.Services, [online] (May 27, 2008) [retrieved on Jul. 18, 2011]. Retrieved from: <URL:http://wiki.services.openoffice.org/wiki/Documentation/OOoAuthors_User_Manual/Getting_Started/Using_AutoCorrect>, 2 pages.

(Continued)

*Primary Examiner* — William Boddie
*Assistant Examiner* — Jeffrey A Parker
(74) *Attorney, Agent, or Firm* — Troutman Sanders LLP; James E. Schutz; Jay R. Anderson

(57) ABSTRACT

Methods, systems, and apparatus, including computer programs encoded on computer storage media, for resolving keystrokes input into an electronic device. One of the methods includes receiving multiple keystrokes in the electronic device. Multiple characters that correspond to the multiple keystrokes are stored in a storage location for a predetermined time interval. In response to the predetermined time interval elapsing, the characters that correspond to the multiple keystrokes are reordered with respect to each other based on a statistical model.

16 Claims, 8 Drawing Sheets

(56) References Cited

OTHER PUBLICATIONS

"Goldtouch", Goldtouch.com [online] (Jul. 4, 2009) [retrieved on Jul. 18, 2011]. Retrieved from: <URL:http://web.archive.org/web/20090704082501/http:/www.goldtouch.com>, 2 pages.

"Goldtouch", Goldtouch.com/t-products [online] (Jul. 4, 2009) [retrieved on Jul. 18, 2011]. Retrieved from: <URL; http://www.goldtouch.com/t-products_1_home.aspx>, 2 pages.

"Goldtouch Catalog", Goldtouch.com/resources [online] (Jul. 4, 2009) [retrieved on Jul. 18, 2011]. Retrieved from: <URL:http://web.archive.org/web/20090124110133/http:/goldtouch.com/Resources/catalog/Goldtouch_Cat alog.pdf>, 16 pages.

Clawson, J., et al., "Automatic Whiteout++: Correcting Mini-QWERTY Typing Errors Using Keypress Timing", CHI 2008 Proceedings, Florence, Italy, Apr. 5-10, 2008, pp. 573-582.

Clawson, J., et al., "Automatic Whiteout: Discovery and Correction of Typographical Errors in Mobile Text Input", Indiana University, Alex Rudnick publications [online] (2007) [Aug. 30, 2010]. Retrieved from: <URL:https://www.cs.indiana.edu/~alexr/pubs/automatic-whiteout_mobileHCI07.pdf>, 4 pages.

Clawson, J., et al., "Automatic Whiteout++: Correcting Mini-Qwerty Typing Errors using Keystroke Timing", Alex Rudnick Google pages [online] (2007) [retrieved on Aug. 31, 2010]. Retrieved from: <URL:http://alex.rudnick.googlepages.com/awpp-iswc-07.pdf>, 8 pages.

* cited by examiner

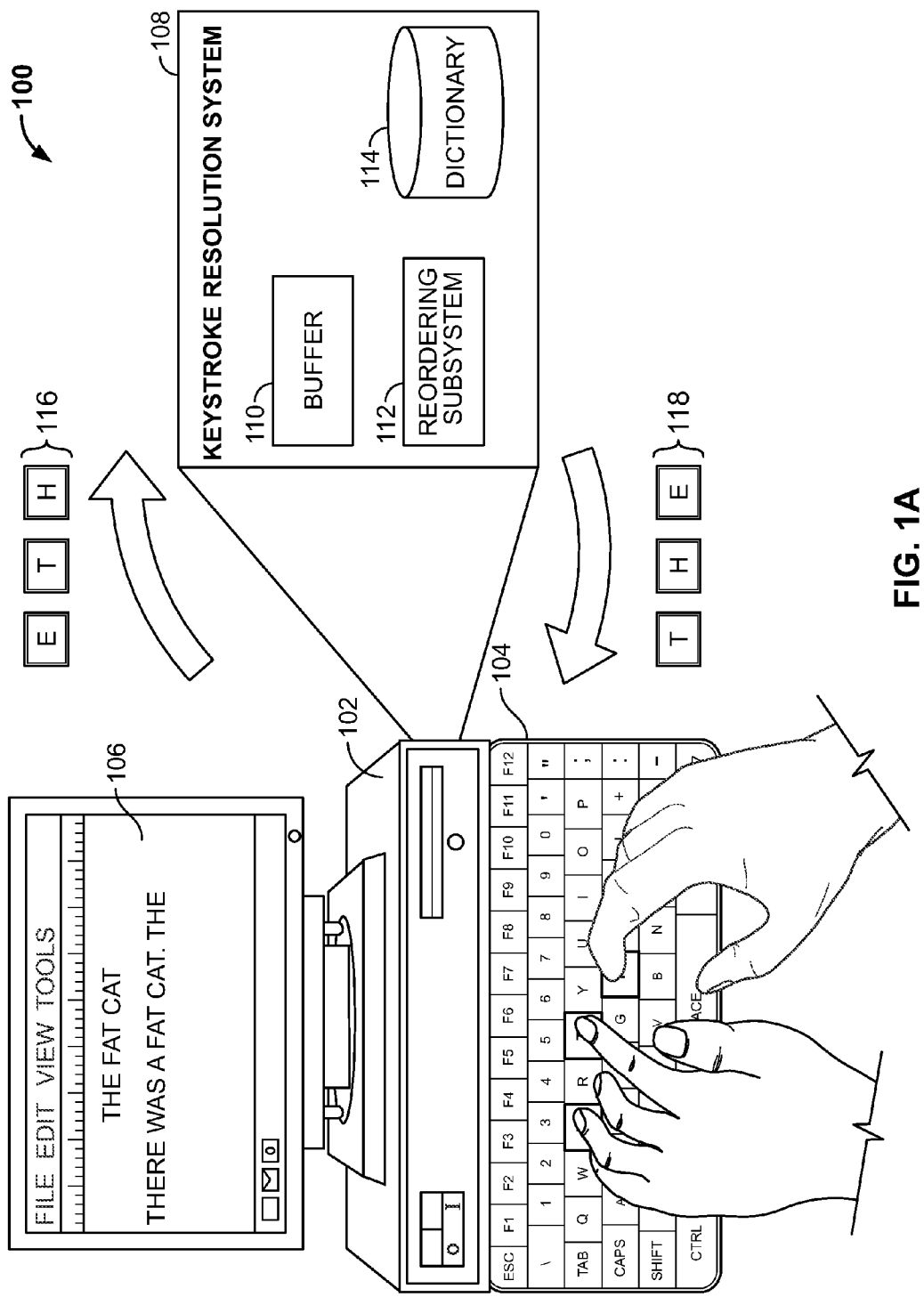

KEYSTROKE RESOLUTION

TECHNICAL FIELD

This document relates to resolving keystrokes that are input by a user of an electronic device.

BACKGROUND

More and more people type information into electronic devices using keyboards for various work-related and personal reasons throughout their day, whether using a personal computer, laptop, or mobile communication device, to name a few examples. People have begun to expect at least some auto-correction or error detection of typographical errors when they are typing. Unfortunately, auto-correct features of certain applications, e.g., when typing in a word processing application, can lead to inadvertent errors if an incorrect word is automatically substituted for a word that may or may not have been misspelled in the first place, sometimes leading to embarrassing results. The challenges of typing without error are further compounded when using a small-sized touch screen keyboard, for example, as found on a mobile communication device, such as a smartphone, or app phone. A touch between two keys or touching more than one key can result in the wrong character being input.

SUMMARY

This specification describes technologies relating to resolving keystrokes input by a user of an electronic device. In general, one aspect, the subject matter described in this specification can be embodied in methods for resolving keystrokes. Multiple keystrokes are received and multiple characters that correspond to multiple keystrokes are stored in a storage location for a predetermined time interval. In response to the predetermined time interval elapsing, the characters that correspond to the multiple keystrokes are reordered with respect to each other based on a statistical model. Other embodiments of this aspect include corresponding systems, apparatus, and computer programs recorded on computer storage devices, each configured to perform the actions of the methods.

These and other embodiments can each optionally include one or more of the following features, alone or in combination. Storing the characters can include buffering data in a buffer that corresponds to the keystrokes received within the predetermined time interval, where the storage location is the buffer. Reordering the characters can include reordering the characters from the buffer. After reordering the characters in the buffer, all the characters can be cleared from the buffer. A second set of characters can be received in the buffer within a second occurrence of the predetermined time interval. In response to the predetermined time interval elapsing a second time, the second set of characters can be reordered based on the statistical model.

After reordering the characters in the buffer, characters can be cleared that have been in the buffer longer than the predetermined interval, where one or more characters remain in the buffer, An additional keystroke can be received and a character that corresponds to the additional keystroke can be added to the one or more characters remaining in the buffer. In response to receiving the additional keystroke, the characters from the buffer can be reordered based on the statistical model.

Reordering the plurality of characters based on the statistical model can include determining multiple permutations of the characters, comparing each of the permutations to one or more dictionaries, calculating a score for each permutation based on the comparison, and selecting the permutation with the highest score. Comparing each of the permutations to one or more dictionaries can include comparing each permutation to a first dictionary and to a second dictionary. Calculating a score for each permutation based on the comparison can include applying a first weighting to a match of the permutation to an entry in the first dictionary and applying a second weighting to a match of the permutation to an entry in the second dictionary, where the first weighting exceeds the second weighting.

The one or more dictionaries can include a first dictionary that includes commonly occurring words and a second dictionary that includes an expanded set of words that is larger in number than the commonly occurring words. The one or more dictionaries can include an n-gram dictionary including a set of n-grams, and wherein each n-gram is a set of n-characters.

Storing the characters that correspond to the multiple keystrokes received within the predetermined time interval can include buffering data corresponding to the characters. Reordering the characters can include reordering the characters from the buffer, including: determining multiple of permutations of the characters in the buffer; combining each permutation with a set of one or more previously buffered keystrokes that form an incomplete word; comparing each of the combinations of permutations and previously buffered keystrokes to one or more dictionaries; calculating a score for each combination based on the comparison; and selecting the permutation that corresponds to the combination with the highest score.

In one example, the predetermined time interval is a time interval in the range of approximately 20 to 50 milliseconds. In some implementations, the predetermined time interval is dynamically extended in duration until a pause in receiving keystrokes is detected. For example, a pause in receiving keystrokes can be detected if a keystroke is not received for at least approximately 50 ms. In some implementations, the predetermined time interval is dynamically shortened in duration if a keystroke indicating a word termination is received.

Characters can continue to be received and stored in the storage location after the predetermined time interval elapses until a pause in receiving keystrokes is detected. Reordering the characters in the storage location can include reordering only the characters received within the last predetermined time interval, but based on all of the characters in the storage location at the time of reordering. Storing the characters can include buffering data that corresponds to the keystrokes received within the predetermined time interval. Data can be received indicating one or more previously received characters forming a partial-character string positioned adjacent to the characters, which together form a continuous character string. Reordering the characters can include reordering the characters from the buffer, including: determining multiple permutations of the characters in the buffer; combining each permutation with the partial-character string to form a plurality of continuous character strings; comparing each of the combinations of permutations and partial-character strings to one or more dictionaries; calculating a score for each combination based on the comparison; and selecting the permutation that corresponds to the combination with the highest score.

In general, in another aspect, a system is described including a keyboard operable to receive from a user keystrokes that represent characters. The system further includes one or more data processing apparatuses which include a buffer and a reordering subsystem. The buffer is operable to receive and buffer a plurality of characters represented by keystrokes received from the keyboard in a predetermined time interval. The reordering subsystem is operable to, in response to the predetermined time interval elapsing, reorder the characters from the buffer based on a statistical model, the reordering including comparing permutations of the characters to one or more dictionaries. The system further includes a memory that includes the one or more dictionaries.

Implementations of the system can include one or more of the following features. The buffer can be further operable to: after the characters from the buffer are reordered, clear all the characters out of the buffer; receive a second set of characters that are represented by a second set of keystrokes in the buffer within a second occurrence of the predetermined time interval. The reordering subsystem is further operable to, in response to the predetermined time interval elapsing a second time, reorder the second set of characters based on the statistical model. The buffer can be further operable to, after the characters in the buffer are reordered, clear characters that have been in the buffer longer than the predetermined interval and retain one or more characters from the characters in the buffer; receive an additional keystroke and add a character that is represented by the additional keystroke to the one or more characters retained in the buffer. The reordering subsystem can be further operable to, in response to the additional character being received in the buffer, reorder the characters from the buffer based on the statistical model.

The one or more dictionaries can include a first dictionary including a set of commonly occurring words and a second dictionary including an expanded set of words. The one or more dictionaries can include an n-gram dictionary including a set of n-grams, and where an n-gram includes a grouping of n characters.

In general, in another aspect, a computer-readable storage device encoded with a computer program product is described, wherein the computer program product includes instructions that, when executed, perform operations including receiving multiple keystrokes, storing multiple characters that correspond to the multiple keystrokes in a storage location for a predetermined time interval, and, in response to the predetermined time interval elapsing, reordering the characters that correspond to the keystrokes with respect to each other based on a statistical model.

Storing the characters can include buffering data that corresponds to the keystrokes received within the predetermined time interval. Reordering the characters can include reordering the characters from the buffer. The instructions, when executed, can perform operations including, after reordering the characters in the buffer, clearing all the characters from the buffer and receiving a second set of characters in the buffer within a second occurrence of the predetermined time interval. In response to the predetermined time interval elapsing a second time, the second set of characters can be reordered based on the statistical model.

The instructions, when executed, can perform operations including, after reordering the characters in the buffer, clearing characters that have been in the buffer longer than the predetermined interval, where one or more characters from the multiple characters remain in the buffer. An additional keystroke can be received and a character that corresponds to the additional keystroke can be added to the one or more characters remaining in the buffer. In response to receiving the additional keystroke, the characters from the buffer can be reordered based on the statistical model. Reordering the characters based on the statistical model can include: determining a multiple permutations of the characters; comparing each of the permutations to one or more dictionaries; calculating a score for each permutation based on the comparison; and selecting the permutation with the highest score.

In general, in another aspect, a computer-implemented method for resolving keystrokes is described. The method includes receiving on a touch screen keyboard a keystroke touching the keyboard between representations of two or more keys, and in response to the keystroke, determining two or more combinations based on the two or more keys and on one or more previously received keystrokes, where the one or more previously received keystrokes form an incomplete word. The two or more combinations are compared to one or more dictionaries. Based on the comparison, which key to attribute to the keystroke is determined. Other embodiments of this aspect include corresponding systems, apparatus, and computer programs recorded on computer storage devices, each configured to perform the actions of the methods.

These and other embodiments can each optionally include one or more of the following features, alone or in combination. Characters corresponding to the one or more previously received keystrokes can be stored in a buffer and two or more combinations based on the two or more keys can be determined by combining characters for each of the two or more keys separately with the characters in the buffer. Based on the comparison of the two or more combinations to one or more dictionaries, a score can be determined for each combination. Determining which key to attribute to the keystroke can include selecting the keystroke included in the combination that has the highest score. Determining a score for each permutation can include applying a first weighting to a match of the permutation to an entry in the first dictionary and applying a second weighting to a match of the permutation to an entry in the second dictionary, where the first weighting exceeds the second weighting.

In general, in another aspect, a system is described that includes a touch screen keyboard, one or more data processing apparatuses and a memory. The touch screen keyboard is operable to receive user touches that represent keystrokes on the keyboard including an ambiguous keystroke, being a user touch that touches two or more keys on the keyboard. The one or more data processing apparatuses include a buffer and a reordering subsystem. The buffer is operable to buffer multiple characters that correspond to keystrokes that represent multiple user touches. The reordering subsystem is operable to determine two or more permutations by combining characters that correspond to each of the two or more keys touched by the ambiguous keystroke separately, with permutations of the characters in the buffer, where the characters in the buffer form an incomplete word. The two or more permutations are compared to one or more dictionaries. Based on the comparison, the key which to attribute to the keystroke is determined. The memory includes the one or more dictionaries.

The details of one or more embodiments are set forth in the accompa-nying drawings and the description below. Other features and advantages will be apparent from the description and drawings, and from the claims.

DESCRIPTION OF DRAWINGS

FIG. 1A is a conceptual diagram of an example system for resolving keystrokes.

Like reference symbols in the various drawings indicate like elements.

DETAILED DESCRIPTION

Figure 1B:
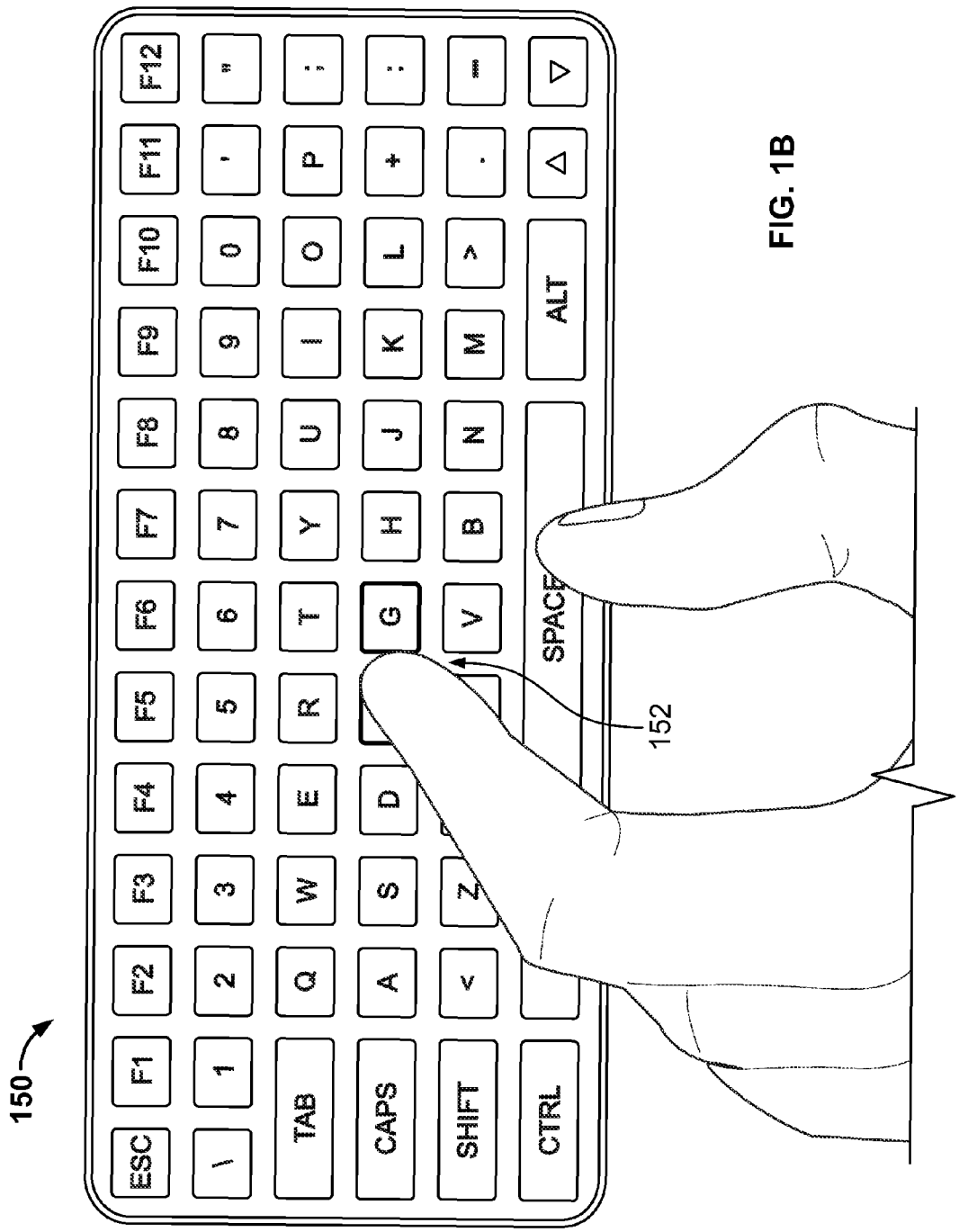
FIG. 1B is a schematic representation of a user inputting an ambiguous keystroke into a touch screen keyboard.

FIG. 1 is a conceptual diagram of an example system 100 for resolving keystrokes input by a user into a user interface mechanism, such as a keyboard. In general, the system 100 operates by recognizing when a user has simultaneously, or near simultaneously, input two or more keystrokes corresponding to two or more characters while typing, and then applies a statistical model to characters the user has typed simultaneously, so as to re-order the characters if necessary.

The example system includes a computer 102 connected to a keyboard 104 for receiving user input. A display device 106 is also connected to the computer 102, to display output to the user. A keystroke resolution system 108 is either included in the computer 102 or accessible by the computer 102, for example, from a server over a network. The keystroke resolution system 108 can be implemented as software, firmware or hardware. In some implementations, the keystroke resolution system 108 is included within another software application, for example, within a word processing application, an e-mail application or a browser application.

The keystroke resolution system 108 is operable to receive multiple keystrokes input by the user through the keyboard 104, which may be a physical keyboard or a virtual keyboard generated on a touch screen display. Characters corresponding to keystrokes received within a certain predetermined time interval can be reordered by the keystroke resolution system 108, if the system determines they were input by the user in an incorrect order. The time period may be measured from one keystroke to a next subsequent keystroke, as a time interval for a predetermined number of sequential keystrokes to be input, or another appropriate time period covering one or more keystrokes. Reordering the characters corresponding to the keystrokes can be based on a statistical model, an example of which is described below. Unlike some auto-correct features in certain applications, where characters are reordered based on a trigger, such as a user pressing a space bar to indicate a word end, reordering by the keystroke resolution system 108 occurs in response to the predetermined time interval elapsing. For example, in the implementation shown, the keystroke resolution system 108 includes a buffer 110. Characters input by the user are buffered in the buffer 110. At the end of the predetermined time interval, all characters in the buffer 110 are used by a reordering subsystem 112 to determine whether or not reordering is necessary, and if so, to provide as output the reordered characters. The statistical model can include comparing a set of characters to words or n-grams found in one or more dictionaries, e.g., dictionary 114. The buffer 110 can then be cleared, and as new characters are input, the buffer 110 begins to fill again for a second occurrence of the predetermined time interval.

The predetermined time interval can be selected to be sufficiently short, so that characters corresponding to keystrokes entered deliberately by the user in a certain order are not reordered. By way of illustration, consider that an average typist can type at a rate of 60 words per minute (wpm), where each word has an average of five characters, and therefore a total of 6 downward keystrokes, if you count the space-bar or punctuation keystroke following each word. Therefore, 60 wpm translates to approximately 360 keystrokes/minute or one keystroke every 167 milliseconds (ms). Therefore, if a user is typing in a consistent, deliberate manner, he or she will type one keystroke approximately every 167 ms. If a user accidentally presses two or more keystrokes at the same time, which has a high likelihood of leading to a typographical error, the two (or more) keystrokes will be input near simultaneously, i.e., within a much smaller interval than 167 ms. The predetermined time interval can be selected so that characters corresponding to keystrokes input nearly simultaneously are gathered together in the buffer and can be sent to the reordering subsystem for reordering, if necessary. For example, the predetermined time interval can be 50 ms. If two keys are input at approximately the same time, they will be input less than 50 ms apart from one another, and therefore characters corresponding to both keystrokes will be present in the buffer at the same time.

Advantageously, characters that were deliberately input by a user, which may spell a word not found within one or more dictionaries used by a typical auto-correct feature, will not be reordered. This advantage can be illustrated by the following example set out in Table 1 below.

TABLE 1

| Character | Time Input (ms) | Characters in Buffer | Action Taken | Output |
|---|---|---|---|---|
| T | 0 | T | None | |
|  | 50 |  | Buffer Cleared | T |
| E | 150 | E | None | |
|  | 200 |  | Buffer Cleared | E |
| H | 320 | H | None | |
|  | 370 |  | Buffer Cleared | H |
| Spacebar | 500 | Spacebar | None | |

By way of example, the characters "teh" are typically reordered by a word processing application to spell the word "the", upon the user inputting the spacebar following the three letters. However, in some instances, the user intended to input the three characters in that order, for example, if typing the name of the Chinese food item "bak kut teh". Referring to Table 1 above, if the user deliberately input the characters "t", "e" and "h" in that order, the total time interval to input the three keystrokes corresponding to the characters will probably be over 300 ms. That is, the keystroke "t" can be input at time 0, the keystroke "e" at time 150 ms and the keystroke "h" at time 320 ms. In this example, only one character is present in the buffer at any given time (see Column 3), since the buffer is cleared after 50 ms and therefore each character is cleared from the buffer before the next keystroke is input. Accordingly, the three characters "t", "e" and "h" are not present in the buffer together and therefore no attempt is made to reorder these characters. The user's intended word of "teh" is therefore not changed, and an inadvertent typographical error caused by an auto-correct feature is avoided, even when the one or more dictionaries are not aware of the word "teh".

As another advantage, a user can intentionally "chord-type" and characters corresponding to keystrokes input together as chords will be reordered, if necessary, since they will most probably be input within the predetermined time interval. That is, a user can deliberately press multiple keys at the approximately the same time. For example, if a user is trying to type the word "saw", he or she can press the "a", "s" and "w" keys at approximately the same time. If the predetermined time interval is set to 50 ms, all three characters are likely to be present in the buffer 110 at the same time, and can therefore be reordered by the reordering subsystem 112, which shall be described in further detail below.

Referring again to FIG. 1, in the example shown, the user is typing in a word processing application and has input the keystrokes "e", "t" and "h" 116 within the predetermined time interval. The three characters corresponding to the keystrokes are therefore present in the buffer 110 at the same time and are reordered by the reordering subsystem 112 to spell the word "the" 118, which is output from the keystroke resolution system 108 and displayed on the display device 106. In this example, unlike the example discussed in reference to Table 1, the keystrokes were input within the predetermined time interval and are reordered to spell "the", as compared to the previous example where the keystrokes corresponding to the characters "the" were input slowly and deliberately by the user, and therefore not reordered.

Figure 2:
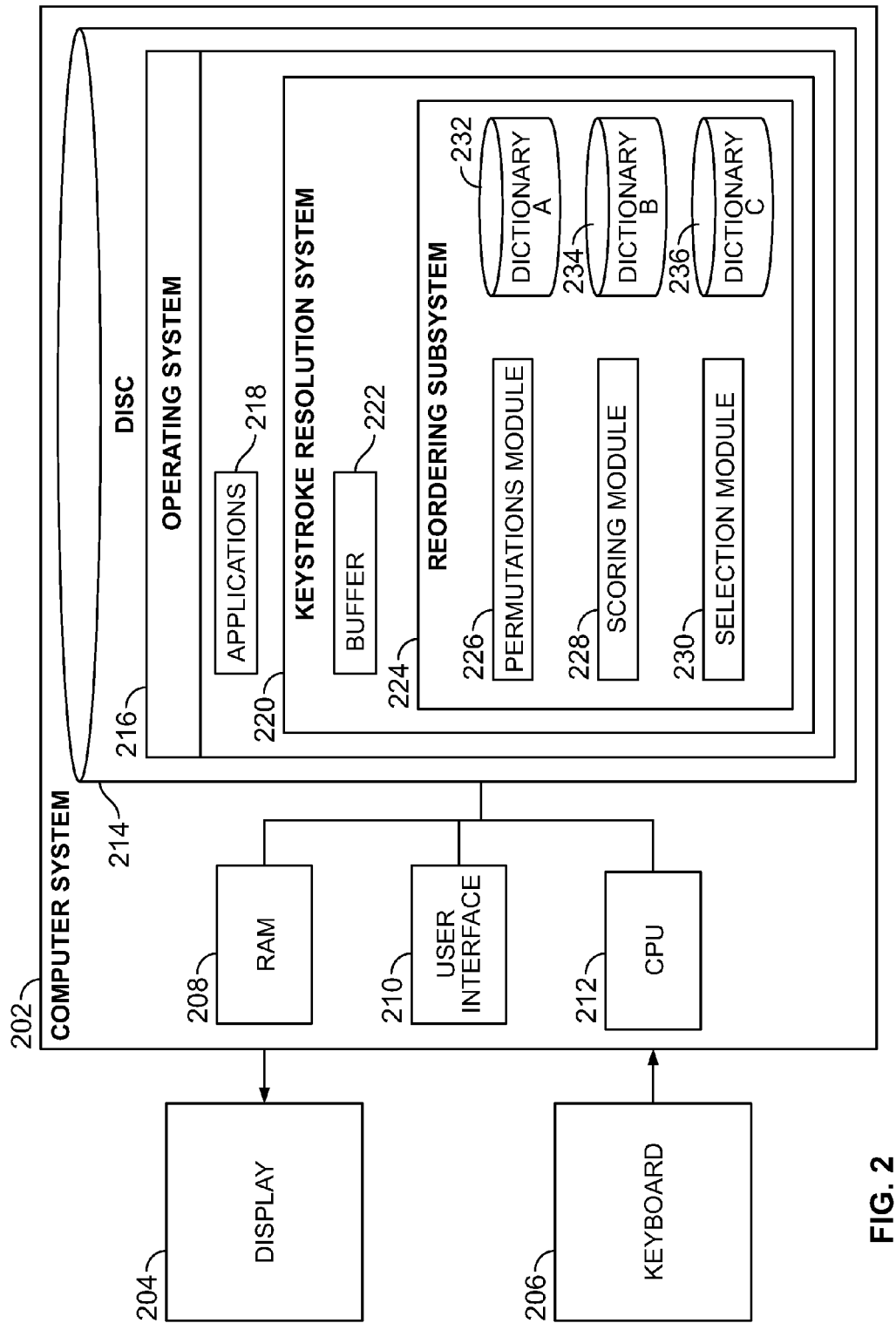
FIG. 2 is a block diagram of an example system for resolving keystrokes.

Referring now to FIG. 2, a schematic representation of an example system 200 that can be used to implement the reordering process described herein is shown. The system 200 includes a computer system 202 operatively connected to a display device 204 and a keyboard 206. The example computer 202 shown includes a RAM (random access memory) 208, user interface 210 and CPU (central processing unit) 212 and a disc 214. The disc 214 includes an operating system 216 and applications 218. The applications 218 can include various applications that receive user input by a keyboard, for example, a word processing application, an e-mail application, a web browser application, or a calendar application. With reference to the example shown in FIG. 1, the particular application implementing the keystroke resolution process is a word processing application. The reordering system and process shall be described for illustrative purposes as being implemented in a word processing application. However, as discussed above, it should be understood that the system and process can be implemented in other applications, for example (and without limitation), a browser application or an e-mail application.

The system further includes a keystroke resolution system 220. In this implementation, the keystroke resolution system 220 includes a buffer 222 and a reordering subsystem 224. The reordering subsystem 224 includes a permutations module 226, a scoring module 228 a selection module 230 and three dictionaries, being Dictionary A 232, Dictionary B 234 and Dictionary C 236.

As mentioned above, when characters are present in the buffer 222, they can be reordered according to a statistical model. A statistical model can be implemented in a variety of ways. Some non-limiting examples include n-gram frequencies or n-gram histograms, word dictionaries (with or without word histograms or word frequencies), heuristic code implementing a model of typical typing mistakes, word-based n-gram frequencies or histograms, neural networks and classifiers.

An example statistical model shall be described in relation to the reordering subsystem 224 included in the keystroke resolution system 220 shown in FIG. 2. This example statistical model is implemented using dictionaries 232-236. For illustrative purposes, the statistical model shall be described using the example set out in Table 2 below. The first column of Table 2 indicates a character input by the user into the keyboard 206. The second column indicates the time at which the keystroke corresponding to the character was input. The third column indicates the characters presently in the buffer 222. The fourth column indicates the action taken, if any, to reorder the characters in the buffer 222. The fifth column indicates the output from the buffer.

TABLE 2

| Character | Time Input (ms) | Characters in Buffer | Action Taken | Output |
|---|---|---|---|---|
| A | 0 | A | | |
| S | 15 | A, S | | |
| W | 45 | A, S, W | | |
| | 50 | | Reordered as SAW; Buffer Cleared | SAW |

In this example, the predetermined time interval at which characters present in the buffer 222 are checked for reordering is 50 ms, although, as discussed above, this time interval can be shorter or longer in other implementations. The user inputs the character A, followed by S and then W. The keystrokes corresponding to the characters are all input within 45 ms of one another, and therefore substantially simultaneously. The user may have been typing quickly or have been purposely chord-typing, i.e., purposely attempting to press all keys near-simultaneously. At time 50 ms, i.e., the end of the predetermined time interval, the three characters are all in the buffer 222, and were input in the order "ASW".

The permutations module 226 included in the reordering subsystem 224 is operable to determine all the permutations of these three characters. That is, the permutations module 226 determines the following six permutations: ASW, SAW, SWA, WSA, WAS, AWS.

The scoring module 228 is operable to determine a score for each permutation. The score for a particular permutation represents the relative statistical likelihood that the permutation is the correct ordering of the characters. To determine the score, the scoring module 228 compares the permutation to the entries in one or more dictionaries to search for one or more matches. In this example, three dictionaries can be used in the comparison, Dictionaries A, B and C 232-236.

In some implementations, Dictionary A 232 includes a relatively small set of words. The words included in the set are commonly occurring words in the particular language used by the reordering subsystem 224, which in this example is English. Therefore, Dictionary A 232 includes a set of commonly occurring words in the English language. The number of entries in the Dictionary A can vary from one implementation to the next, but in this example, the number of entries is approximately 50 words.

In some implementations, Dictionary B 234 includes an extended set of commonly occurring words in the particular language, excluding the words included in Dictionary A 232. Again, the number of entries in Dictionary B can vary, but in this example, the number of entries is approximately 3000 words. The particular number of words in either dictionary can be a function of processing power of a device (so that the number of words may be set dynamically and automatically by the device), or expected processing power (so that the number of words may be set beforehand by a programmer or administrator), so that the functions described here can be achieved adequately without interfering with other processes that need to occur on the device.

In some implementations, one or more dictionaries that include entries of n-grams can be included in the reordering subsystem 224. An n-gram is a set of n characters that occur together as either a word or as a part of word in the particular language in which the dictionary is being used. In the present example, Dictionary C 236 is a 3-gram dictionary. That is, the entries in Dictionary C 236 are sets of 3 characters, where a set of characters either forms a 3-characters word, or a set of 3 characters that occurs within a word (or words) in the English language. For example, "ion" can be a 3-gram entry in Dictionary C 236. The letters "ion" form a word and also form a commonly occurring permutation of characters, for example, as found in the words: combination, salutation, ovation (to name a few examples).

Referring again to the example in Table 2, each permutation is searched against the three dictionaries. In this example, a first match is found to the permutation WAS in Dictionary A 232, since WAS is a commonly occurring English word and is included in the short list of common words forming Dictionary A 232. Additionally, a second match is found to the permutation SAW in Dictionary B 234. SAW is also a fairly common English word, and is included in the expanded list of words forming Dictionary B 234. In this example, the other four permutations are not matched to any entries in any of the three dictionaries.

The scoring module 228 determines a score for each of the permutations based on the comparisons of the permutations to the dictionaries 232-236. If more than one dictionary is used in the comparisons, then a weight can be assigned to each dictionary. That is, a match found to an entry in Dictionary A 232 can be weighted to give a higher score than a match found to an entry in Dictionary B 234. Similarly, a match found to an entry in Dictionary B 234 can be weighted to give a higher score than a match found to an entry in Dictionary C 236. The weighting can be selected based on the statistical likelihood of the matched entry being the intended word or permutation of letters typed by the user. That is, words that are statistically more likely to be the correct word can be included in Dictionary A 232, which has the highest weighting.

In the current example, if statistically the chances that the characters ASW were intended to form the word WAS are higher than being intended to form the word SAW, then the scoring module 228 can give a higher score to the permutation WAS than SAW. That is, since the permutation WAS is included in the Dictionary A 232, and a higher weighting is given to matches in Dictionary A 232, then even though a match was found to the word SAW in Dictionary B 234, the permutation WAS is assigned a higher score by the scoring module 228. The other four permutations in this example did not match to entries in any of the dictionaries, and therefore received a score of zero.

The selection module 230 selects which permutation to output from the reordering system 224 based on the scores determined by the scoring module 230. In this example, since the permutation WAS is assigned the highest score, this permutation is selected by the selection module 230 and output from the reordering subsystem 224. The selection can be provided to the application that input the characters to the keystroke resolution system 220, which in this example is the word processing application 218. The reordered characters can then be output to the display device 204 and displayed on the display device 204 for the user.

Figure 3A:
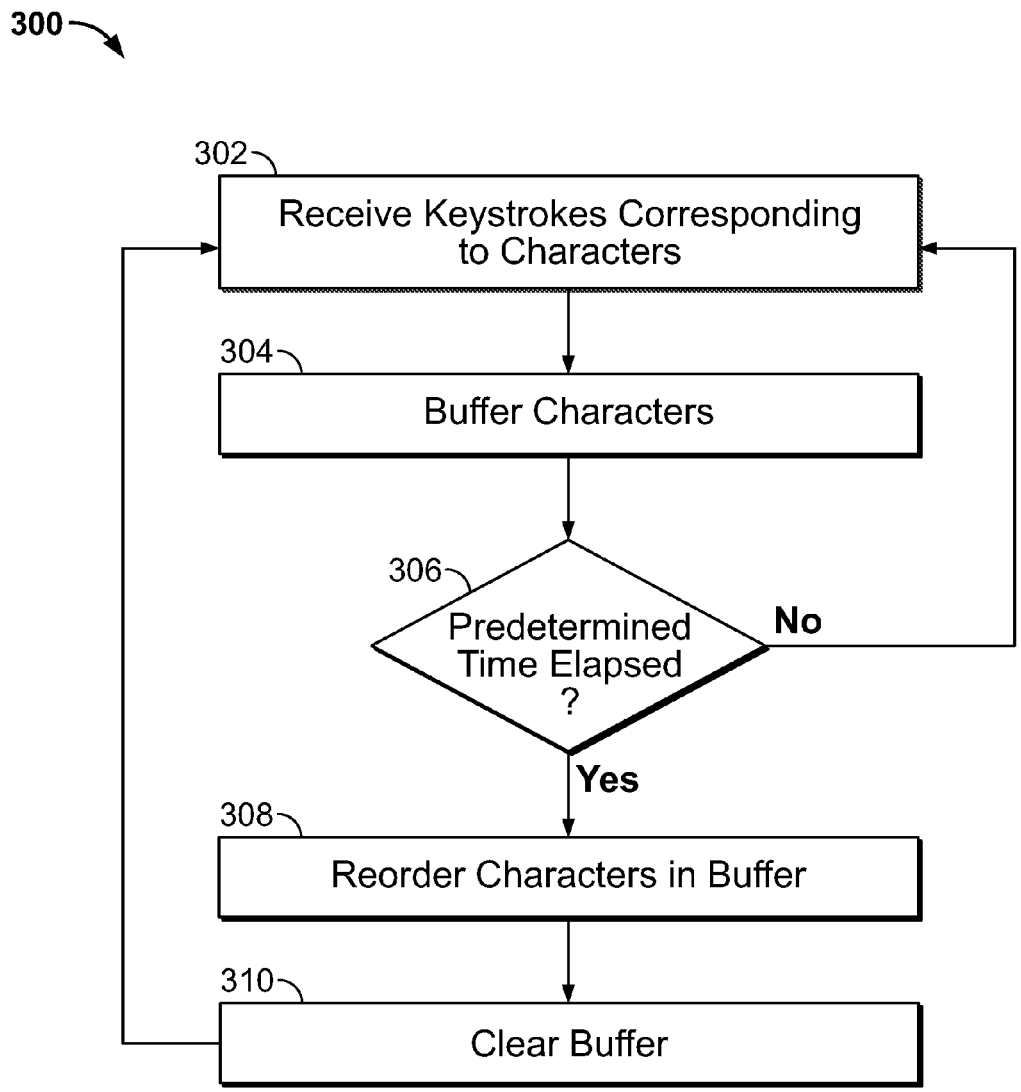
FIG. 3A is a flow chart of an example process for resolving keystrokes.

Referring to FIG. 3A, a flowchart shows an example process 300 for reordering characters based on a statistical model. A set of two or more characters are received as input from a user (Box 302). By way of illustrative example, the process 300 can be described in relation to the example system 200 shown in FIG. 2, although it should be understood that a different configuration of system can be used. In this example, the keystrokes corresponding to the characters can be received from the keyboard 206 at the keystroke resolution system 220.

The received characters can be buffered in a buffer (Box 304). That is, all characters received within a predetermined time interval can be included in the buffer, such as buffer 222. Once the predetermined time interval has elapsed ("Yes" branch of decision box 306), the characters can be reordered, if necessary (Box 308). If the predetermined time interval has not yet elapsed ("No" branch of decision box 306), then one or more additional characters can be received and buffered until the predetermined time interval has elapsed.

After the predetermined time interval has elapsed, for example, after 50 ms (as one illustrative example), the characters in the buffer can be reordered if necessary, based on a statistical model (Box 308). The reordered characters can be output and the buffer cleared (Box 310). The process 300 can then begin again at box 302, that is, one or more additional characters can be received, buffered and reordered. The process 300 can continue while a typing operation is ongoing in whatever application is using the keystroke resolution system 220, such as a word processing application, e-mail application or browser application, to name a few examples.

Figure 4:
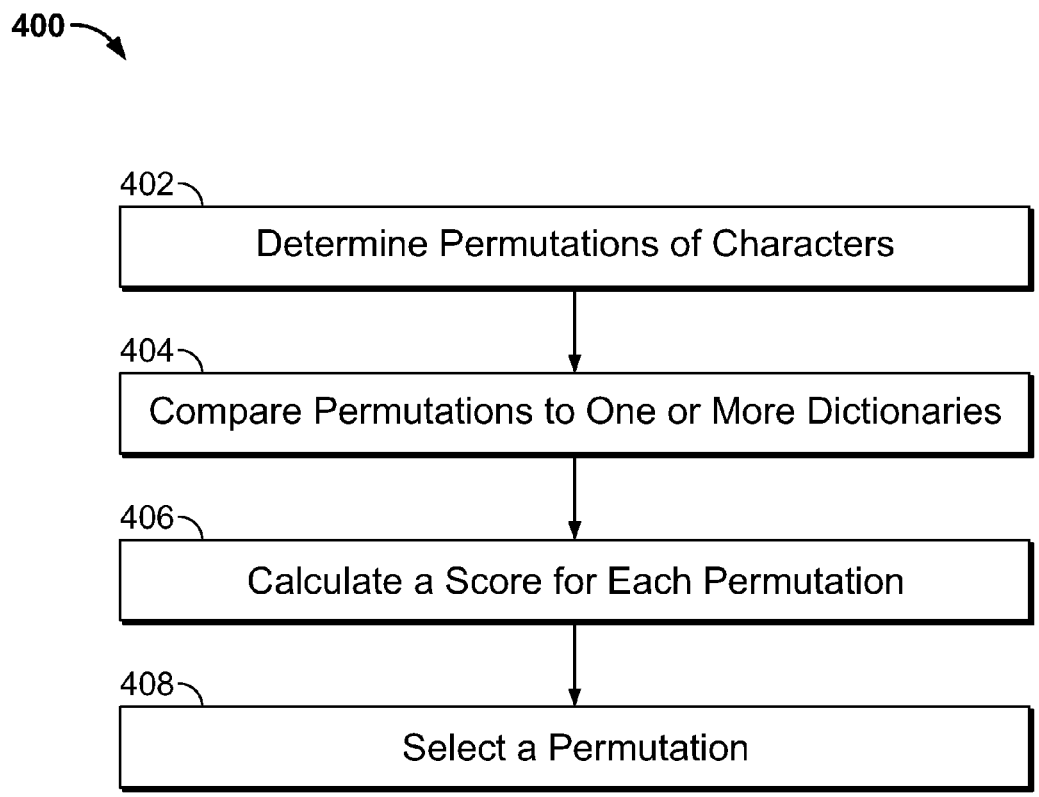
FIG. 4 is a flow chart of an example process for resolving a keystroke with a statistical model.

Referring now to FIG. 4, an example process 400 for reordering the characters based on a statistical model, i.e., an example process for carrying out box 308 in process 300, is shown. Using the characters in the buffer, permutations of the characters are determined (Box 402). For example, the permutations module 226 can determine the permutations of the characters in the buffer 222.

The permutations are each compared to one or more dictionaries (Box 404). For example, the scoring module 228 can compare each permutation to the entries in Dictionaries A, B and C 232-236. A score is calculated for each permutation (Box 406). For example, the scoring module 228 can calculate a score for each permutation based on the comparisons to the Dictionaries A, B and C 232-236. If a permutation matched an entry in a dictionary, then a score can be assigned the permutation. In some implementations, a weighting can be assigned to each dictionary, such that a match to an entry in one dictionary provides a higher score than a match to an entry in a second dictionary. The entries in the dictionaries and the weightings assigned to each dictionary can be selected based on a statistical analysis of the likelihood that the characters were intended to form the given entry. That is, the entries in Dictionary A 232 can be selected as those words most likely intended to be formed by the characters, and Dictionary A can be given the highest weighting. Dictionary B can be given a relatively lower weighting and the 3-gram Dictionary C can be given an even lower weighting.

A permutation can be selected based on the scores calculated for each permutation (Box 408). For example, the selection module 230 can select the permutation assigned the highest score by the scoring module 228. The selected permutation can then be output to an application using the keystroke resolution system 220, for example, the word processing application 218.

In some implementations, the process 400 reorders the characters based on an adaptive statistical model. That is, one or more of the dictionaries, e.g., Dictionaries A-C, can be adaptive. For example, if a user inputs a word that is not included in the Dictionaries A-C, the user can be prompted to add the word to one of the dictionaries. Prompting a user to add the word can be triggered, for example, by a user rejecting a character re-ordering, or based on the particular word being input by the user at a frequency exceeding a predetermined threshold frequency. In some implementations, each word input by the user is added to one of the dictionaries, if it is not already included. For example, a character string identified as a word (i.e., characters between word terminators, such as spaces or punctuation marks) can be compared to dictionary entries and if not found, then added to the dictionary.

In some implementations, a word determined to be frequently input by the user can be added to one of the dictionaries without requiring a user input. A customized dictionary can therefore build overtime that is relevant to the particular user's input habits. An adaptive statistical model can also be implemented to learn particular mistakes input frequently by the user, so that these mistakes once identified can be resolved more efficiently. For example, if a user frequently inputs SNED rather than SEND, when these characters are buffered in this order, the actions in boxes 404 and 406 can be skipped and the SEND permutation automatically selected.

In some implementations including an adaptive statistical model, the adaptive feature can be selectively turned off by the user. For example, a user inputting text in an incognito mode, e.g., private web browsing, may select to turn off the adaptive feature. In another example, the adaptive feature can be turned off when the user is inputting text into certain types of fields, e.g., a password field. For example, if inputting a password into a browser application, the browser application can send data to the keystroke resolution system indicating the keystrokes relate to a password, directly or indirectly, so that the keystroke resolution system can turn off the adaptive feature.

In some implementations, one or more different sets of dictionaries can be available to the scoring module 228, where a first set of dictionaries includes entries for words and n-grams in a first language and a second set of dictionaries includes entries for words and n-grams in a second language. The scoring module 228 can be configured to access the appropriate set of dictionaries depending on the language being typed by the user. For example, the keystroke resolution system can determine the language based on a user input selecting a natural language to use with a keyboard that can be used for more than one natural language. Other techniques for language detection can be used and data about the language communicated to the keystroke resolution system. In some implementations, a set of dictionaries can be adapted for a language other than a natural language, e.g., for a computer programming language.

Figure 3B:
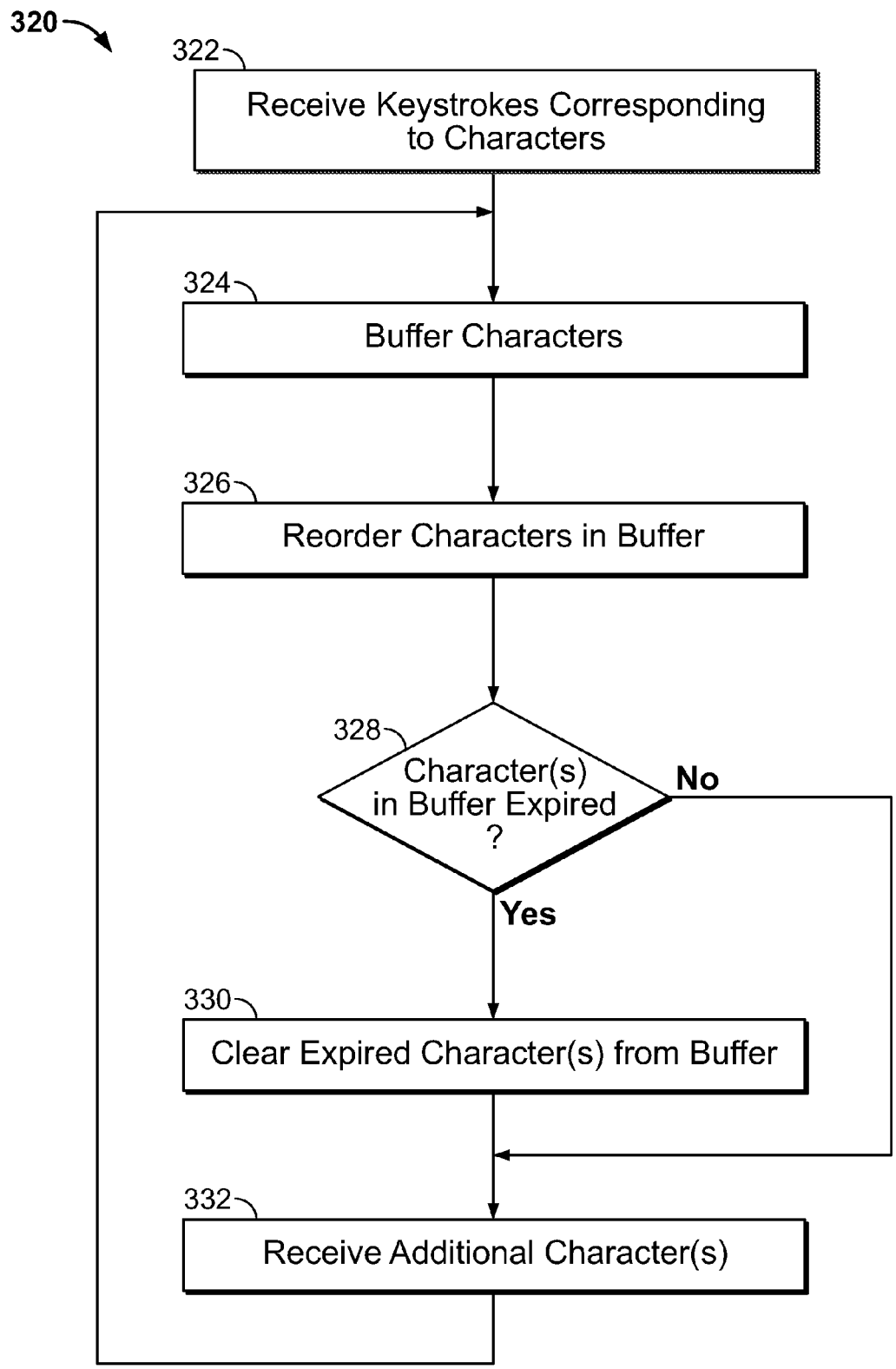
FIG. 3B is a flow chart of an alternative example process for resolving keystrokes.

Referring now to FIG. 3B, in some implementations a sliding window buffer can be used as compared to the buffering described above in relation to FIG. 3A. That is, characters can be expelled from the buffer on a character-by-character basis based on the time at which a particular character was received into the buffer. In the example described above, all the characters corresponding to keystrokes input within a predetermined time interval, e.g., 50 ms, were gathered in the buffer and reordered and then the buffer was cleared. That is, the characters were considered together as a set. However, in implementations using a sliding window buffer, as a particular character ages out, i.e., has been in the buffer longer than the predetermined time interval, that particular character can be cleared from the buffer, while other "still fresh" characters stay in the buffer, which can be joined by recently input new characters.

For illustrative purposes, the example process 320 for reordering characters using a sliding window buffer shall be described with reference to the example shown in Table 3 below.

TABLE 3

| Character | Time Input (ms) | Characters in Sliding Window Buffer | Action Taken | Output |
|---|---|---|---|---|
| H | 0 | H | | |
| E | 25 | H, E | | |
| O | 45 | H, E, O | Reordered as HOE | |
|   | 50 | O, E | H cleared at age 50 ms | H |
| M | 65 | O, E, M | Reordered as OME | |
|   | 75 | O, M | E cleared at age 50 ms | E |

Keystrokes corresponding to characters are received from a user input, such as an interaction with a keyboard (Box 322). The characters are buffered in the sliding window buffer (Box 324). In this example, at time 0, the character H is received. Within a relatively short time span, a second character, E, is received. A reordering subsystem can determine whether or not the characters in the buffer, i.e., HE, need to be reordered and in this example would leave them as is, since HE forms the common word "he". The second character is quickly followed by a third character at time 45 ms of O. The buffer now includes the characters entered in the following order "HEO". If, based on a statistical modeling, reordering is determined necessary, then HEO are reordered (Box 326). For example, by comparing the various permutations of these characters to one or more dictionaries, the permutation HOE can be selected as most likely to be the word (or character ordering) intended by the user. The characters are therefore reordered as HOE. In some implementations, Box 326 can be performed using the process 400 described above in reference to FIG. 4.

Referring again to FIG. 3B, a determination is made as to whether one or more characters in the buffer have expired, i.e., have been in the buffer for longer than the predetermined time interval. At time 50 ms, it is determined that the character H has aged out ("Yes" branch of decision box 328), and the H is cleared from the buffer (Box 330). After the buffer is cleared, or if no characters are expired, e.g., at time 46 ms ("No" branch of decision box 328), then one or more additional characters can be received into the buffer (Box 332). The process 320 can then loop back to buffering characters (i.e., Box 324) and reordering characters presently in the buffer (if required) (i.e., to Box 326).

In this example, at time 50 ms the H is cleared from the buffer, leaving the characters O and E, in that order. At time 65 ms a new character is received in the buffer, i.e., the character M. The buffer now includes the characters OEM. In some implementations, only the characters currently in the buffer are considered when determining whether and how to reorder the characters, therefore the 6 permutations of OEM, OME, MOE, MEO, EOM and EMO are used in the statistical model to determine a reordering, if at all.

In some implementations, the predetermined time interval can be dynamically shortened or lengthened based on user input activity. For example, the user input activity can be the user inputting a continuous series of characters. In order to detect that the user has completed inputting the series of characters, the buffer can gather characters for the predetermined time interval (e.g., 50 ms), and then if a next character is not received within a second predetermined time interval (e.g., another 50 ms), then the buffered characters can be reordered (if necessary). If a next character is received, then the next character is added to the buffer and the second predetermined time interval can restart. Once there is no new character entered within the second predetermined time interval, the series of characters is presumed finished and the characters gathered in the buffer can be reordered (if necessary).

In some implementations, the predetermined time interval can be extended based on user input activity, as described above, but only those characters received within the last predetermined time interval are reordered. In such implementations, when determining whether or not to reorder the characters in the buffer, a character that was received prior to the predetermined time interval can remain in the buffer and can be taken into consideration, even though the particular character will not itself be ordered. Referring to the example above, the character H can stay in the buffer (e.g., until a pause in user input activity is detected) along with the other characters that were input without any keystroke indicating a word break (e.g., a spacebar or punctuation keystroke) and within the predetermined time interval (or before a pause is detected). A permutations module included in a reordering subsystem can use the following permutations: HOEM, HOME, HMOE, HMEO, HEOM, HEMO rather than permutations not including the character H, although the H stays in the first-letter position, since the letter H will not be reordered. These character strings can then be compared to one or more dictionaries to determine which has the higher statistical likelihood of being the intended word.

In this example, the word HOME may match an entry in one of the dictionaries, e.g., Dictionary A 232 or Dictionary B 234 in the example system 200 shown in FIG. 2. The 4-gram HEMO may match an entry in a 4-gram dictionary, for example, if Dictionary C 236 is a 4-gram dictionary, since this permutation of characters shows up in some words, e.g., hemoglobin. If the dictionaries are weighted, then the HOME permutation is likely to receive the higher score, since Dictionary A 232 should be given a higher weighting, and this permutation would therefore be selected. The characters in the buffer are then reordered as OME.

In another example, the user input activity can be the user inputting a punctuation character or other special character indicating a word termination (e.g., a space). Such user input activity can trigger a truncating of the predetermined time interval, and all characters received in the buffer at that time (even if less than the predetermined time interval, e.g., less than 50 ms) can be reordered, if necessary, and the buffer then cleared.

In another example, the duration of the predetermined time interval can be dynamically changed based on user input activity corresponding to the user's typing errors, for example, by detecting particular user keystrokes or keystroke combinations that are frequently input incorrectly by the user. In one example, if a particular keystroke is frequently followed by a backspace keystroke, i.e., by the user clearing the keystroke suggesting the keystroke was input in error, the statistical model on which the keystroke resolution is based can learn this behavior and adapt accordingly. An adaptation may include extending the length of the predetermined interval after the character corresponding to the particular keystroke is received in the buffer. For example, a user may press the Y key more often in error, since it is in the top row of the keyboard and perhaps more difficult for the user to reach. If the Y key is frequently followed by the user inputting a backspace to erase the Y character, then when the Y character is in the buffer, the predetermined time interval before the Y is expelled from the buffer can be extended, e.g., by approximately 20 to 50 ms.

In another example, a user may be prone to input more errors when inputting two keystrokes with the first keystroke from the left hand and the second keystroke from the right hand (or visa versa). The adaptation in this example may be to extend the predetermined interval for a character in the buffer if a next character received corresponds to a key that would typically be pressed by the opposite hand. In another example, if a user input a word that was spelled wrong and the word was added to one of the dictionaries, the system can subsequently unlearn the word, i.e., remove the word from the dictionary. If each time the particular word is retrieved from the dictionary and used to correct a word input by the user, the user then inputs backspaces to delete the "corrected" version of the word, the system can adapt by removing the word from the dictionary. Other types of data can be learned by the system, such that the statistical model can adapt in response.

In some implementations, characters other than letters in an alphabet can be buffered and used by the reordering system when determining permutations and scoring the permutations. For example, the phrase "thi sis a mistake" can be corrected to "this is a mistake", if the spacebar keystroke is buffered with one or more surrounding keystrokes, i.e., is input within the predetermined time interval. Similarly, punctuation can be buffered and reordered, such as "the en.d" can be reordered to "the end." Again, this can occur if the period keystroke is present in the buffer with one or more surrounding keystrokes, i.e., received with the predetermined time interval.

Referring now to FIG. 1B, a touch screen keyboard 150 is shown. That is, a keyboard implemented as a touch screen, where representations of keyboard buttons are presented to the user, who can then touch a representation of a keyboard button to input a corresponding keystroke, is shown. A touch screen keyboard can have spaces between the representations of the keyboard buttons. A user can accidentally press the space between two or more keyboard buttons, rather than press the center of the intended keyboard button, which shall be referred to herein as an "ambiguous keystroke". In some keyboards, the keyboard button closest to the user's touch is presumed to be the keyboard button intended to be touched, and the corresponding character is taken as the user input. However, this technique for resolving an ambiguous keystroke can lead to typographical errors, since the correct character may not always correspond to the nearest keyboard button.

Figure 5:
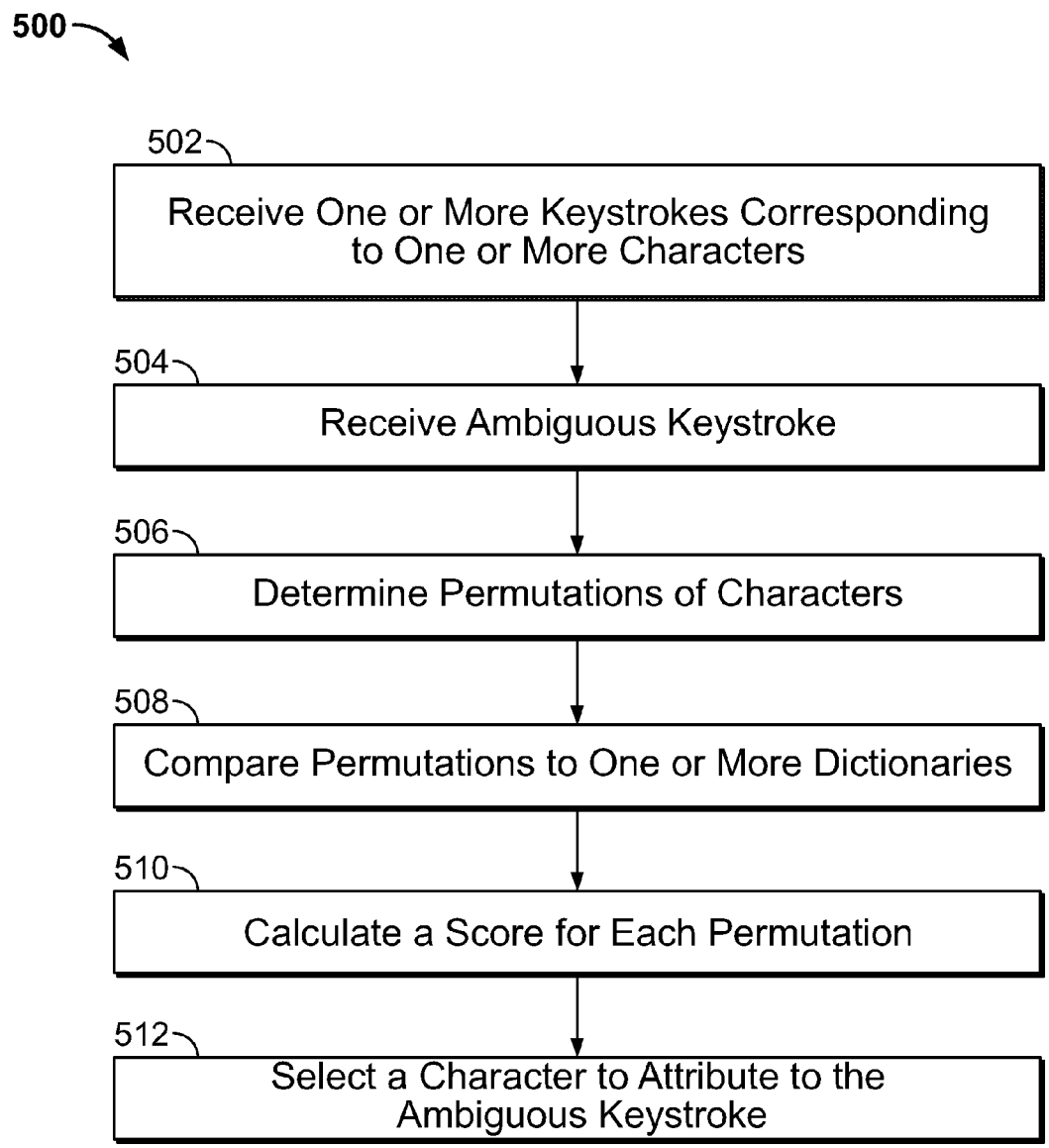
FIG. 5 is a flow chart of an example process for resolving an ambiguous keystroke.

Referring to FIG. 5, an example process 500 is shown for resolving an ambiguous keystroke. One or more keystrokes corresponding to one or more characters can be received (Box 502). That is, one or more keystrokes that are not ambiguous. One or more ambiguous keystrokes are received (Box 502). For example, the user's hand shown in FIG. 1B has touched the touch screen keyboard 150 at point 152, which is between the representation of the F keyboard button and the representation of the G keyboard button, and is therefore an ambiguous keystroke. For illustrative purposes, the process 500 shall be described in reference to an example where the user has input an F and an I in Box 502, and then pressed the space 152 between the F and G keyboard buttons in Box 504.

In response to receiving an ambiguous keystroke, the ambiguous keystroke is considered together with previously received characters that are presumed to be in the same word (e.g., because of no intervening spacebar or punctuation keystroke) to determine what character was actually intended by the ambiguous keystroke, based on a statistical model. That is, in this example, the process 500 is used to determine whether the ambiguous keystroke was intended to be an F or a G character.

The previously received characters can be combined together with each possible character corresponding to the ambiguous keystroke (Box 506). In this example, the combinations result in the character strings FIF and FIG. The previously received characters, i.e., the "FI", are treated together and are presumed to come before the ambiguous keystroke. The resulting character strings are each compared to one or more dictionaries (Box 508). For example, dictionaries similar to those discussed in reference to the example in Table 2 can be used for the comparison. That is, the character strings can be compared to a Dictionary A that includes a small set of commonly occurring words, to a Dictionary B that includes an expanded set of commonly (although less commonly) occurring words, and to a Dictionary C that includes n-gram entries, where the n-gram can be, for example, a 3-gram being different sets of three-letter permutations often occurring within words in the English language.

A score is calculated for each character string based on the comparisons (Box 510). In some implementations, if more than one dictionary is used, a weighting can be applied to a match found in each dictionary, with a higher weighting be assigned to an entry that is statistically more likely to be the intended character string. For example, the highest weighting can be assigned to Dictionary A, a next weighting to Dictionary B and the lowest weighting to Dictionary C. In this example, the character string FIF is not likely to match an entry in either Dictionary A or Dictionary B, although FIF might be included in a 3-gram Dictionary C. The character string FIG is likely to match an entry in either Dictionary B or 3-gram Dictionary C, since it forms the word "fig". For the purposes of this example, assume that a match for FIG is found in Dictionary B and no match is found for FIF. A character is selected to attribute to the ambiguous keystroke based on the calculated scores (Box 512). That is, the character included in the character string with the highest score can be selected to attribute to the ambiguous keystroke. In this example, the G character is selected to attribute to the ambiguous keystroke, which is therefore resolved as the G character.

In some implementations, the process 500 can be implemented using a system such as system 200 shown in FIG. 2, where the keyboard 206 is a touch screen keyboard. In such implementations, the permutations module 226 is operable to determine the combinations of the characters corresponding to previously received keystrokes together with the ambiguous keystroke, as described above. The selection module 230 is operable to select the character to attribute to the ambiguous keystroke. In such implementations, the buffer 222 is option, i.e., the process 500 can be implemented without a buffer.

The process described above for resolving an ambiguous keystroke does not rely on a temporal trigger, but rather a spatial trigger. That is, if the user's input is a touch that is centered at a point that is not directly associated with a particular keystroke, i.e., is an ambiguous keystroke, then in response the keystroke is resolved using a statistical model as described herein. In this process, the timing of the user input as compared to other keystrokes received by the user is not used to trigger to keystroke resolution process.

However, it should be understood that the keystroke resolution processes 300 and 320 described in relation to FIGS. 3A and 3B above can be used to resolve keystrokes entered by a user using a touch screen keyboard, i.e., to reorder characters buffered within a predetermined time interval. That is, characters can be buffered along with the two potential characters received as a result of an ambiguous keystroke. Characters in the buffer can be combined with either of the two potential characters corresponding to the ambiguous keystroke to determine a set of permutations that can be scored, as described above in reference to processes 300 and 320.

In some implementations, the statistical model can be based on either the previously input text (characters) or on the context of the operating system or application. The operating system or an application using the keystroke resolution system may know more about the context of the user's keystrokes than just which keystrokes have been input. For example, if the user opens a document (e.g., received from another author or drafted by the user but not completed), the user may notice a word spelled wrong or incompletely and move a cursor to that location in the document and begin typing. For a user that prefers chord-typing, i.e., pressing two or more keys substantially simultaneously, the system can be better able to resolve the user's keystrokes if the previously input characters that will be in the same character string as the new characters being input by chord typing are known.

By way of illustrative example, the user opens a document and discovers that the word "example" is spelled wrong in that the last two letter, i.e., the "le" are missing from the end of the word, which currently reads "examp". The user moves the cursor to the position in the document immediately following the character "p". The user then chord-types "el". That is, the user attempts to press the "e" and "l" keys together and does press them within 50 ms of each other, but the "e" is depressed just before the "l", and therefore the characters are received buffer in the wrong order. If the system only considers the "e" and "l" present in the buffer when attempting to resolve the keystrokes, then the system may leave them in the order they were received and not re-order the characters. The entire character string will then read "exampel", and is therefore spelled incorrectly.

However, if the keystroke resolution system is aware of the context in which the characters are being received, then this type of error can be avoided. For example, if the system is aware that immediately preceding the characters received in the buffer, there is an uninterrupted character string "examp", where uninterrupted refers to a character string that is not interrupted by a word terminator (e.g., a space or punctuation mark), then the system can combine the previously input character string with the characters received in the buffer. That is, the system can combine "examp" with "el" and with "le" to determine the two character strings "exampel" and "example". Once compared against one or more dictionaries and scored, the "le" permutation will have a higher score and be selected as the proper order of the two characters. The spelling error is therefore avoided. In some implementations, the application, e.g., in this instance the word processing application, can provide this data to the keystroke resolution system, so that the keystrokes input by the user, i.e., the "e" and "l" can be resolved by the statistical model in the appropriate context, i.e., as characters forming part of a character string that already includes the characters "examp".

Figure 6:
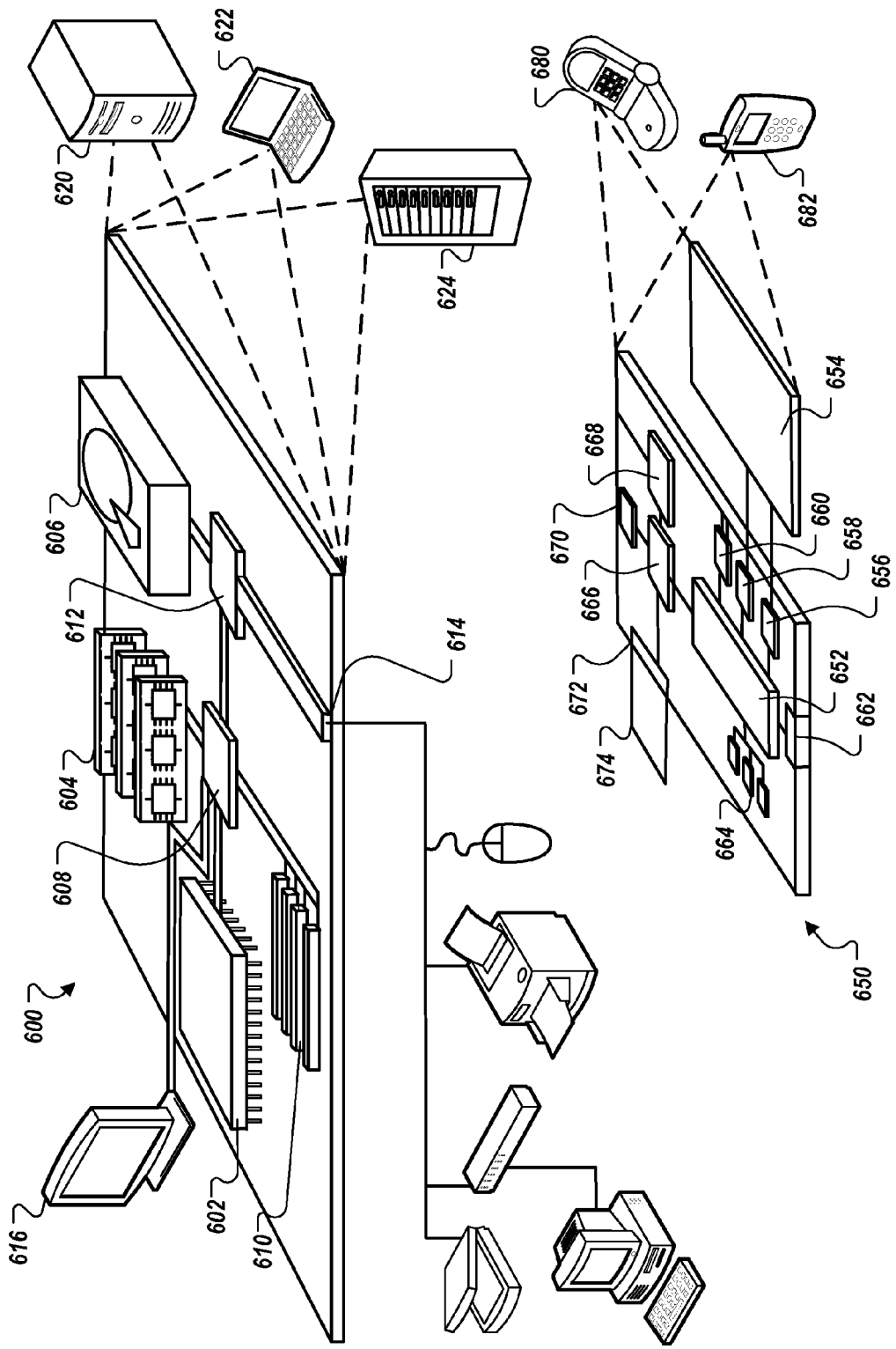
FIG. 6 shows examples of generic computer devices that may be used to execute the actions discussed in this document.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer-readable or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for instance, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Device 650 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 650 and used to update the display of the respective devices 650 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
receiving, by a processor, an indication of a first plurality of keystrokes;
storing, by the processor, and in a buffer already containing at least one character received during a first predetermined time interval, a plurality of characters corresponding to the first plurality of keystrokes; and
responsive to completion of a second predetermined time interval, reordering, by the processor and based on the at least one character from the previous predetermined time interval and a statistical model, characters from the plurality of characters corresponding to the first plurality of keystrokes, but not the at least one character, wherein the second predetermined time interval occurs subsequent to the first predetermined time interval.

2. The method of claim 1, further comprising:
after reordering the characters from the plurality of characters corresponding to the first plurality of keystrokes, but not the at least one character, clearing all characters from the buffer;
storing, by the processor, and in the buffer, a second plurality of characters corresponding to a second plurality of keystrokes;
responsive to completion of a third predetermined time interval, reordering the second plurality of characters based on the statistical model.

3. The method of claim 1, wherein the reordering of the characters from the plurality of characters corresponding to the first plurality of keystrokes but not the at least one character, based on the at least one character and the statistical model comprises:
  determining a plurality of permutations of the characters corresponding to the first plurality of keystrokes and the at least one character;
  comparing each permutation from the plurality permutations to one or more dictionaries;
  calculating, based on the comparing, a score for each permutation; and
  selecting a permutation associated with a highest calculated score from the plurality of permutations.

4. The method of claim 3, wherein:
  the comparing of each permutation from the plurality permutations to one or more dictionaries comprises comparing each permutation to a first dictionary and to a second dictionary; and
  the calculating, based on the comparing, of the score for each permutation comprises applying a first weighting to a match of the respective permutation to an entry in the first dictionary and applying a second weighting to a match of the respective permutation to an entry in the second dictionary, the first weighting exceeding the second weighting.

5. The method of claim 3, wherein the one or more dictionaries comprises a first dictionary that includes commonly occurring words and a second dictionary that includes an expanded set of words that is larger in number than the commonly occurring words.

6. The method of claim 3, wherein the one or more dictionaries includes an n-gram dictionary comprising a set of n-grams, and wherein each n-gram from the set of n-grams comprises a set of n-characters.

7. The method of claim 1, wherein the second predetermined time interval is a time interval in the range of approximately 20 to 50 milliseconds.

8. The method of claim 1, wherein the second predetermined time interval is dynamically extended in duration until a pause in receiving keystrokes is detected.

9. The method of claim 8, wherein a pause in receiving keystrokes is detected if a keystroke is not received for at least approximately 50 ms.

10. The method of claim 1, wherein the second predetermined time interval is dynamically shortened in duration if a keystroke indicating a word termination is received.

11. A computer-implemented method, comprising:
  receiving a plurality of keystrokes within a first predetermined time interval;
  storing a plurality of characters that correspond to the plurality of keystrokes in a buffer for a second predetermined time interval;
  receiving data indicating one or more previously received characters comprising a partial-character string positioned adjacent to the plurality of characters, which together form a continuous character string;
  in response to the second predetermined time interval elapsing, reordering the characters that correspond to the plurality of keystrokes with respect to each other based on a statistical model, wherein the reordering comprises:
  determining a plurality of permutations of the characters that correspond to the plurality of keystrokes;
  combining each permutation with the partial-character string to form a plurality of continuous character strings;
  comparing each of the continuous character strings to one or more dictionaries;
  calculating a score for each continuous character string based on the comparison; and
  selecting the permutation that corresponds to the continuous character string associated with the highest score.

12. A system comprising:
  a keyboard operable to receive from a user keystrokes that represent characters;
  one or more data processing apparatuses comprising:
    a buffer operable to receive and buffer a plurality of characters represented by keystrokes received from the keyboard in a predetermined time interval;
    a reordering subsystem operable to, in response to the predetermined time interval elapsing, reorder the plurality of characters from the buffer based on a statistical model, the reordering including comparing permutations of the characters to one or more dictionaries; and
    a memory comprising the one or more dictionaries;
  the buffer further operable to:
    after the plurality of characters in the buffer are reordered, clear characters that have been in the buffer longer than the predetermined interval and retain one or more characters from the plurality of characters in the buffer; and
    receive an additional keystroke and add a character that is represented by the additional keystroke to the one or more characters retained in the buffer; and
  the reordering subsystem further operable to, in response to the additional character being received in the buffer, reorder the characters from the buffer based on the statistical model.

13. The system of claim 12, wherein:
  the one or more dictionaries include a first dictionary comprising a set of commonly occurring words and a second dictionary comprising an expanded set of words.

14. The system of claim 12, wherein:
  the one or more dictionaries include an n-gram dictionary comprising a set of n-grams, and where an n-gram comprises a grouping of n characters.

15. A computer-readable storage device encoded with a computer program product, the computer program product including instructions that, when executed, perform operations comprising:
  responsive to receiving a plurality of keystrokes storing data representing a plurality of characters that correspond to the plurality of keystrokes in a buffer for a predetermined time interval;
  in response to the predetermined time interval elapsing, updating, based on a statistical model, the data in the buffer representing the plurality of characters to reflect reordering the plurality of characters with respect to each other;
  after reordering the plurality of characters, clearing data from the buffer representing characters that have been represented in the buffer longer than the predetermined interval, wherein one or more characters from the plurality of characters remain represented in the buffer;
  receiving an additional keystroke and adding data to the buffer representing a character that corresponds to the additional keystroke; and
  in response to receiving the additional keystroke, updating, based on the statistical model, the buffer to reflect reordering of the characters represented in the buffer, including the one or more characters from the plurality of characters that remain represented in the buffer and the character that corresponds to the additional keystroke.

16. The computer-readable storage device of claim 15, wherein reordering the plurality of characters based on the statistical model comprises:
   determining a plurality of permutations of characters from the plurality of characters;
   comparing permutations from the plurality of permutations to one or more dictionaries;
   calculating a score for each of the permutations based on the comparison; and
   selecting a permutation associated with the highest score.

* * * * *